Aug. 12, 1952     M. K. GOLDSTEIN     2,607,034
SIGNAL GENERATOR SYSTEM
Filed April 29, 1946                            2 SHEETS—SHEET 1
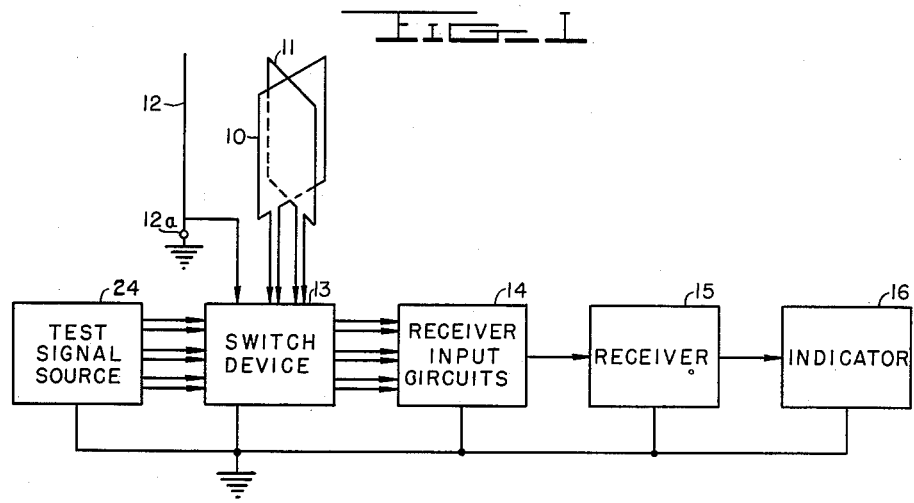
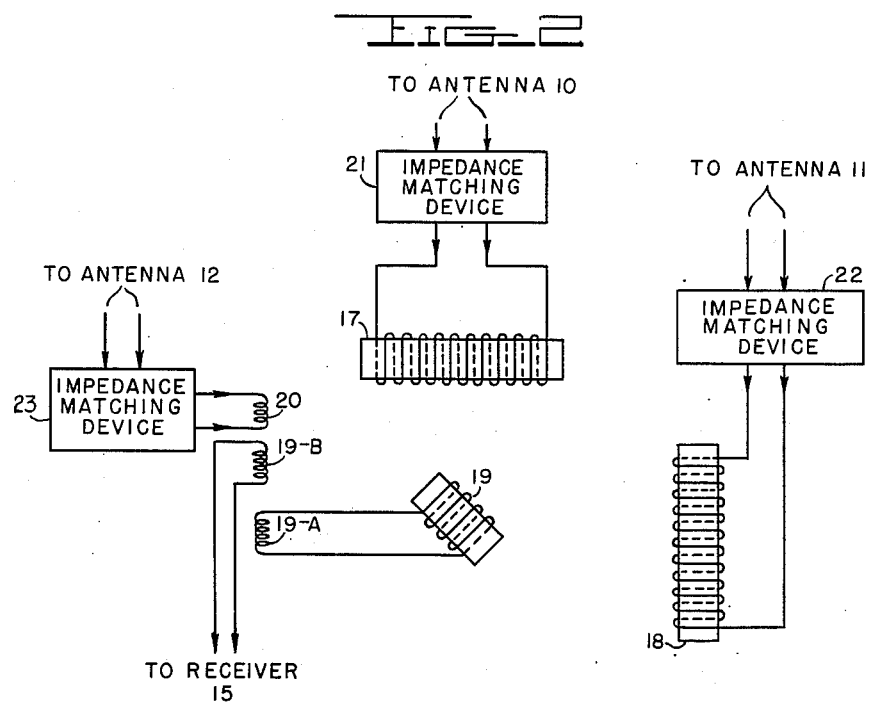
*INVENTOR.*
MAXWELL K. GOLDSTEIN
BY
*ATTORNEY*

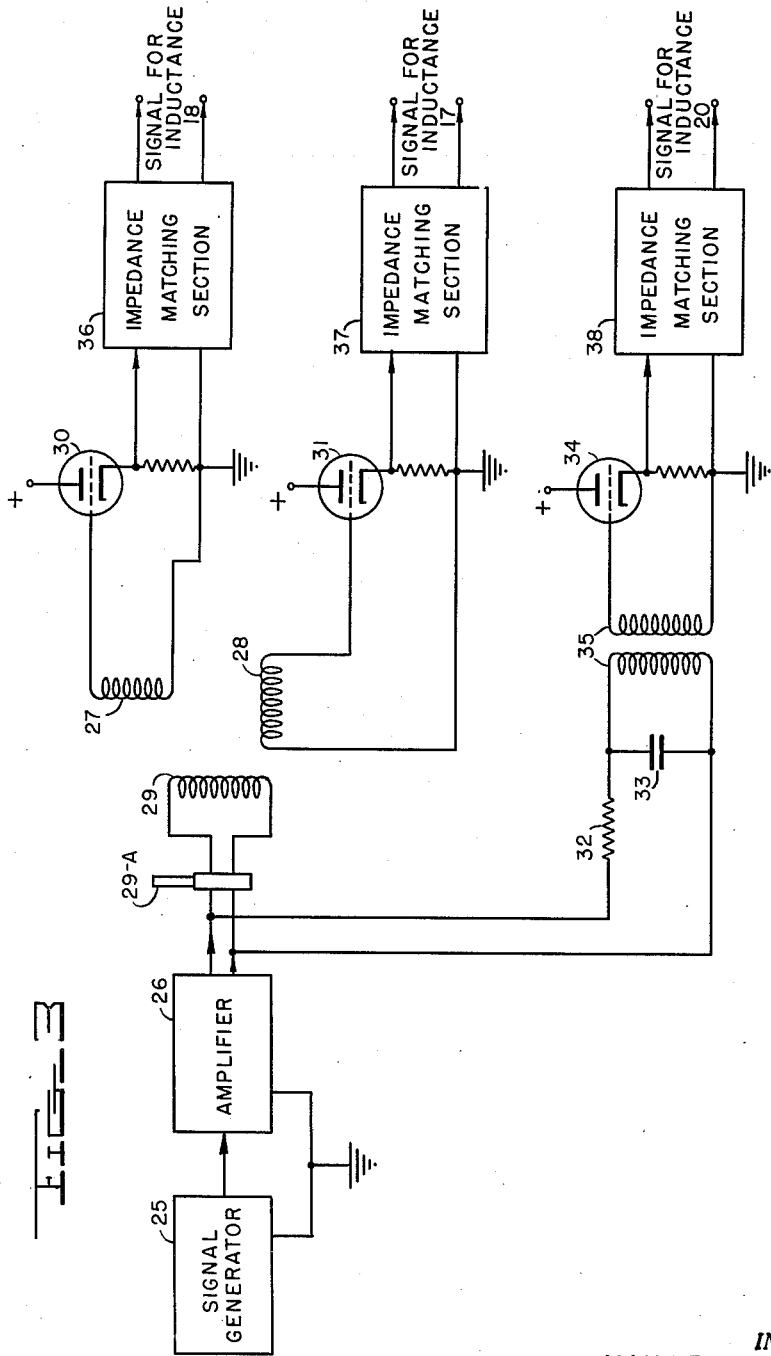

Patented Aug. 12, 1952

2,607,034

UNITED STATES PATENT OFFICE 2,607,034

SIGNAL GENERATOR SYSTEM

Maxwell K. Goldstein, Washington, D. C.

Application April 29, 1946, Serial No. 665,713

13 Claims. (Cl. 343—113)

(Granted under the act of March 3, 1883, as amended April 30, 1928; 370 O. G. 757)

This invention relates to signal generator devices and in particular to generator devices for producing signals having the characteristics of those signals derived from an incoming radio signal wavefront by an antenna system of a radio direction finder system.

In radio direction finder antenna systems designed to derive energy signals from an incoming wavefront to permit a determination of the direction of arrival of the wavefront without ambiguity, special signal combining and resolving circuits must be employed. These circuits require accurate alignment which can only be achieved when signals are simultaneously applied thereto which bear the relationships which exist in the signals supplied by an actual antenna system. In many circumstances it becomes desirable to align the input circuits independently of an antenna system. This is particularly true in the production line or the shop where the uncertainties accompanying the reception of a signal from a distant source by an antenna system cannot be tolerated.

It is therefore an object of the present invention to provide a signal generator system for producing signal conditions as would exist when receiving from a distant signal source by a conventional direction finder antenna or collector system.

Another object of the present invention is to provide a signal generator system capable of producing a plurality of voltage signals having amplitude and phase relationships similar to those which would be produced by a conventional direction finder antenna or collector system when receiving from a distant station whose frequency may occur at any point over a selected wide range of frequencies.

Another object of the present invention is to provide apparatus for determining the absolute performance of radio direction finder systems.

Other and further objects and features of the present invention will become apparent upon consideration of the accompanying description and drawings which illustrate typical features of the present invention.

Fig. 1 shows, partly in block, a typical radio direction finder system to which the components of the present invention have been affixed.

Fig. 2 is a schematic diagram showing the construction of the receiver input circuits as employed in the direction finder system of Fig. 1.

Fig. 3 is a schematic diagram, partly in block, of a signal generation system embodying the features of the present invention.

In accordance with the fundamental concepts of the present invention, a signal generator system is provided by which a plurality of signals bearing amplitude and frequency characteristics similar to those obtained from a radio direction finder collector or antenna system are produced. A conventional radio frequency signal generator is employed to produce a radio frequency signal which may be adjusted to any frequency in the band over which the radio direction finder is to operate.

To simulate the directional characteristics of a direction finder antenna system, a three element inductor system is employed in which power from the radio frequency signal source is supplied to a first inductance. Second and third inductances are positioned with their axes bearing angular mutual relationships such that the coupling to the first inductance will produce induced voltages in the second and third inductances in amplitude ratio dependency on the angular orientation of the first inductance. This ratio may be adjusted by variation in the angular position of the first inductance to simulate different directions of arrival of incoming signals.

To simulate a "sense" input signal for the radio direction finder system a third signal is derived from the radio frequency signal in a manner independent of variations in the position of the movable first inductance.

The amplitude of the output signals from the directional elements of a direction finder antenna system is, in general, greater at higher frequencies than at low frequencies. Over the usual frequencies employed in direction finder systems the output signals from the sense antenna are substantially independent of frequency. To simulate this frequency variation characteristic a frequency selective network is provided in the signal generator system. This selective network maintains a definite vectorial (both magnitude and phase components) ratio between the resultant of the directional signal components and the sense signal components such as would exist in an actual collector system.

With reference to Fig. 1, a radio direction finder system is shown employing a conventional multiple antenna system having directional elements of the "loop" type. These directional elements 10 and 11 are placed at right angles so that they are capable of deriving space quadrature related components of an incoming signal. A sense antenna 12 having multi-directional reception characteristics is employed to derive a signal from an incoming wavefront whose amplitude is independent of the direction of arrival of the wavefront. Output voltages from the antennas 10, 11 and 12 are applied through a switching device 13 to the receiver input circuits 14. The circuits 14 operate to eliminate the 180° ambiguity present in a figure-8 response pattern of a loop type system by combining the three antenna voltages to produce a single voltage of cardioid pattern whose amplitude is at a minimum or equal to zero only in one direction of incoming signal wavefront. The single combination signal from the receiver input circuits is then amplified in a conventional receiver system 15 to facilitate a determination of the amplitude thereof. To facilitate this determination, a visual or aural indicator 16 is provided.

The collector system employing fixed crossed loop antennas 10 and 11, each providing balanced output signals, may be replaced by other types of directional collector systems such as a single rotatable loop, or a single rotatable pair of vertical antennas (e. g. Adcock H-type), or two pair of fixed crossed vertical antennas (e. g. Adcock crossed-H).

Methods by which the signals from a direction finder antenna system may be combined in the receiver input circuits 14 to produce an output signal having a null in one direction are well known. A short description of a typical method is included here for reference.

In Fig. 2, receiver input components contained within a shielding case are shown. Two fixed position inductances 17, 18 are employed to receive energy from the directional antennas 10 and 11, respectively. This received energy sets up inductive fields within the shielded enclosure which, because of the angular relationships of antennas 10, 11 and inductances 17, 18 may reproduce directional energy conditions similar to those existing in the vicinity of antennas 10, 11. A positionable inductance 19 absorbs a part of this energy for deliverance to the receiver 15. The amplitude and phasing of the voltage signal produced across inductance 19 with respect to the signals applied across inductances 17 and 18 depend upon the orientation thereof with respect to the inductances 17, 18. For example, when the longitudinal axis of inductance 19 is parallel to the longitudinal axis of inductance 17, the voltage induced in inductance 19 is substantially in phase with and of an amplitude proportional to that impressed across inductance 17.

The energy intercepted by inductance 19 is supplied through a coupling inductive arrangement including inductances 19-A and 19-B to the receiver 15. The signal thus developed across inductance 19-B is supplemented by energy from inductance 20 derived from the sense antenna collector 12. The energy delivered to inductance 19-B from inductance 20 bears vectorial relationship with respect to the energy delivered to inductance 19-B from inductance 19-A which may cause cancellation or reenforcement. In one angular position of the longitudinal axis of inductance 19 opposition of the signal components induced in inductance 19-B will exist. If the amplitudes of the components are equal, minimum output signal to receiver 15 will result. Such a condition is one which is desired in actual operation.

Impedance matching devices 21, 22, 23 are provided to efficiently couple the signals applied to inductances 17, 18 and 20 so that such a condition of amplitude equality may occur. Additional phase and amplitude compensating circuits are incorporated in impedance matching unit 23 (or 21 and 22) to permit proper phase and amplitude compensation of the energy from the directional and omnidirectional channels over the frequency range employed.

The primary purpose of the test signal source 24 is to produce signal components bearing the same amplitude phase and frequency characteristics as those produced by an actual complete antenna system so that the impedance matching devices 21, 22, 23 of the receiver input circuits 14 may be adjusted without requiring an actual antenna system. An additional purpose of the source 24 is to provide apparatus for determining the absolute performance of direction finding systems. This is accomplished by evaluating bearing accuracy and resolving power of the direction finders for various signal amplitudes, frequencies and apparent azimuth angles.

Typical features of the test signal source 24 are shown in detail in Fig. 3. A radio frequency signal, preferably unmodulated, is produced by the signal generator 25. It is desirable that the frequency and amplitude of this signal be adjustable so that the operational frequency and signal intensity ranges of the direction finder system may be covered. The output signal from the generator 25 is applied to a buffer-amplifier 26. The two variable amplitude components of an incoming signal as normally produced by the antennas 10, 11 are simulated by a pair of inductances 27, 28 arranged with their longitudinal axes in a common plane but bearing quadrature positional relationship. Inductances 27, 28 are coupled to a third inductance 29 which may be positionable angularly through 360 degrees by means of an externally projecting control 29-A. The inductances 27, 28 may thus derive components of the voltage applied across inductance 29 by amplifier 26 bearing amplitude relationships in dependency on the orientation of inductance 29. To prevent loading of the inductances by subsequent components, cathode follower amplifiers 30, 31 are placed in the output circuits thereof.

The output signal from amplifier 26 is also employed to derive a "sense" voltage to simulate the "sense" signal received by antenna 12. The transformer 35 and cathode follower amplifier 34 are employed in this circuit. To truly simulate the signals derived by a direction finder antenna system this "sense" voltage must bear certain frequency-amplitude and phase relationships with respect to the resultant of the signal components induced in inductances 27, 28. In conventional collector systems the resultant signal from the directional elements of the antenna, which must be opposed by the signal from the "sense" element in the receiver input circuits 14, has the characteristics of increasing amplitude with increasing frequency. The output voltage from the "sense" element of the antenna system is substantially independent of frequency. To counteract this effect the impedance matching devices 21, 22, 23 are provided with frequency selective elements. A frequency responsive network comprising resistance 32 and capacitance 33 is therefore employed in the simulator circuits to reduce the amplitude and control the phase of the signal applied to the cathode follower output amplifier 34 as the operating frequency increases. This network is chosen so that the magnitude of the resistance of element 32 is at least 10 times the capacitive reactance of element 33 at the highest frequency for which operation is intended. These elements and the voltage ratio of the coupling transformer 35 are chosen so that the resultant of the signals from the amplifiers 30, 31 bears the same amplitude, phase and frequency relationships to the signal from the amplifier 34 as exist between the resultant of the signals from antennas 10, 11 and antenna 12 at the lowest frequency for which operation is desired.

Since the purpose of the generating system of Fig. 3 is to provide signals for the adjustment of the impedance matching elements 21, 22, 23 of the receiver input circuits, it is necessary that the output impedance of each of the channels from amplifiers 30, 31, 34 be equal, respectively, to the impedance of the connections to the antennas 10, 11, 12. To this end, impedance matching sections 36, 37, 38 are included so that a matched condition can be produced. An additional purpose of the matching sections 36, 37, 38 is to transform the unbalanced output signals of each of the amplifiers 30, 31, 34 so that they will appear as balanced (push-pull) signals to simulate more closely the actual output of a balanced type collector system.

In a permanent installation of a complete direction finder system it may be desirable to connect the test signal source 24 so that a check of the system may be made rapidly and with as little cable changing as possible. A switch device 13 may therefore be provided to permit a quick selection of the source of input signals to the receiver input circuits 14.

From the foregoing discussion it is apparent that considerable modification of the features of this invention is possible and while the devices herein described and the forms of apparatus for the operation thereof constitutes a preferred embodiment of the invention it is to be understood that the invention is not limited to the precise material shown and that changes may be made therein without departing from the scope of the invention as defined in the appended claims.

This invention may be used or manufactured by or for the Government of the United States for governmental purposes without the payment of any royalties thereon or therefor.

What is claimed is:

1. An artificial signal generating device to simulate actual signal reception conditions of a radio direction finder collector system, comprising: means producing oscillatory signals of variable frequency and amplitude, means deriving first and second components from said oscillatory signals, means adjusting the relative amplitudes of the first and second related components to simulate different directions of signal reception, means deriving a sense signal component from said oscillatory signals independently of variations in relative amplitudes of the first and second components, and frequency responsive means varying the vectorial ratio of the resultant of the first and second signals to the sense signal component in a manner in dependency on the frequency of the oscillatory signals.

2. An artificial signal generating device to simulate actual signal reception conditions of a radio direction finder collector system, comprising: a local source for producing oscillatory signals of frequencies and amplitude similar to those of an actual signal, first positionable inductor means receiving energy from the local source, second and third inductor means deriving first and second related components of the signal applied to the first inductor in amplitude dependency on the orientation of the first inductor, means deriving a sense signal component from said oscillatory signals independently of the amplitude of the first and second related components, and frequency responsive means varying the vectorial ratio of the resultant of the first and second signals to the sense signal in dependency on the frequency of the oscillatory signals in a manner to simulate the vectorial ratios derived from the radio direction finder collector system.

3. An artificial signal generating device for simulating actual signal reception conditions of a radio direction finder system having omnidirectional and directional collector elements, comprising: a local source producing oscillatory signals adjustable to frequencies and amplitudes in the range of operation of the direction finder system, first and second inductances positioned with their longitudinal axes in one plane and mutually perpendicular, a third inductance magnetically linked to the first two inductances in an amount in dependency on the axial orientation thereof with respect to the axis of each of the first and second inductances in the aforementioned plane, means positioning said third inductance in the aforementioned plane, means applying the signal from said local source to said third inductance, and a coupling network deriving independently of the orientation of the third inductance a signal from said source bearing the amplitude phase and frequency characteristics relative to the resultant of the signals produced in the first and second inductances as exist between the energy from the omnidirectional collector elements and the resultant of the energy from the directional collector elements as exist in an actual direction finder antenna system.

4. An artificial signal generating device to simulate actual signal reception conditions of a radio direction finder collector system, comprising: a local source producing oscillatory signals of frequencies and amplitudes similar to those of actual signal sources, first and second inductances positioned with their longitudinal axes in one plane and mutually perpendicular, a third inductance magnetically linked to the first two inductances in the aforementioned plane, means positioning said third inductance in the aforementioned plane, means applying the signal from said local source to said third inductance, means deriving a signal from said signal source independently of the orientation of said third inductance, and a frequency selective system varying the vectorial ratio between the resultant of the signals induced in the first and second inductances and the signal derived by the last named means in a manner to simulate the vectorial ratios derived from the radio direction finder collector system.

5. An artificial signal generating device to simulate actual signal reception conditions of a radio direction finder collector system, comprising: means simulating received radio signals for producing oscillatory signals of variable frequency and amplitude, means for deriving first and second components from said oscillatory signals, means for adjusting the relative amplitudes of the first and second related components to simulate different directions of signal reception, and means for deriving a sense signal component from said oscillatory signals independently of variations in relative amplitudes of the first and second components.

6. An artificial signal generating device to simulate actual signal reception conditions of a radio direction finder collector system comprising: a local source of radio frequency energy, means for deriving first and second components from said energy, means for varying the relative amplitudes of the first and second components to simulate different directions of signal reception, means for deriving from said energy a sense signal component independent of the amplitude variance of said first two components, and separate output circuits for said components.

7. In a calibrating arrangement for a radio direction finder system having a plurality of inputs for signals from a plurality of antennae the combination with said system comprising: a local source of radio frequency energy, means for deriving from said energy a plurality of components simulating the antennae signals and means for separately impressing said components upon the corresponding inputs of the system.

8. The combination of claim 7 further provided with means for selectively impressing said antennae signals or said locally generated components on the corresponding inputs of the system.

9. In a calibrating arrangement for a radio wave direction finder system having first and second inputs for separate signals derived from space quadrature antennae and a third input for a signal derived from a sense antenna, the combination with said system comprising: a local source of radio frequency energy, means for deriving first and second related components from said energy to simulate different directions of radio reception, means for adjusting the relative amplitudes of said first and second components, means for deriving a third component from said energy simulating a sense signal and means for separately impressing said three components upon the three respective inputs of the system.

10. The combination of claim 9 further provided with means for selectively connecting said antennae signals or said locally generated components to the respective inputs of the system.

11. A multi-signal generator comprising: a source of radio frequency energy variable in frequency, means for deriving at least two component output signals from said energy, separate output circuits for said signals and means in one of said output circuits for varying in dependence on a frequency variation a characteristic of one signal relative to the same characteristic of said other signal.

12. A multi-signal generator comprising: a source of radio frequency energy variable in frequency, means for deriving first and second component output signals from said energy, means for varying the amplitude and sense of said first two signals, means unaffected by said signal variance for deriving a third component output signal from said energy, output circuits for said signals, and means varying in dependence on a frequency variation a characteristic of said third signal relative to the same characteristics of said other two signals.

13. A multi-signal generator comprising a source of radio frequency energy variable in frequency, means deriving from said energy first and second component output signals related in amplitude and sense as scalar sine and cosine components, means for varying the amplitude and sense of said first two signals in accordance with their relationship, means unaffected by said signal variance for deriving a third component output signal from said energy, and means for varying in dependence on a frequency variation the vector characteristic of said third signal relative to the vector characteristics of said other two signals.

MAXWELL K. GOLDSTEIN.

REFERENCES CITED

The following references are of record in the file of this patent:

UNITED STATES PATENTS

| Number | Name | Date |
|---|---|---|
| 2,388,262 | Ganiayre et al. | Nov. 6, 1945 |
| 2,406,858 | Shepherd et al. | Sept. 3, 1946 |
| 2,444,193 | Gillette et al. | June 29, 1948 |

OTHER REFERENCES

Alien Property Custodian application, Ser. No. 401,099, published May 25, 1943.